US00RE36294E

United States Patent [19]

Brehm et al.

[11] E Patent Number: Re. 36,294

[45] Reissued Date of Patent: Sep. 7, 1999

[54] SCRATCH-RESISTANT COATING AGENT BASED ON ARCYLATES

[75] Inventors: Manfred Brehm, Aschaffenburg; Michael Mueller, Bensheim; Rolf Neeb, Pfungstadt, all of Germany

[73] Assignee: Röhm GmbH Chemische Fabrik, Darmstadt, Germany

[21] Appl. No.: 08/862,434

[22] Filed: May 23, 1997

Related U.S. Patent Documents

Reissue of:

[64] Patent No.: 5,418,304
Issued: May 23, 1995
Appl. No.: 08/257,200
Filed: Jun. 9, 1994

[30] Foreign Application Priority Data

Jun. 9, 1993 [DE] Germany ..... 43 19 198

[51] Int. Cl.[6] ..... C08F 18/20

[52] U.S. Cl. ..... 526/245

[58] Field of Search ..... 526/245

[56] References Cited

FOREIGN PATENT DOCUMENTS

| | | |
|---|---|---|
| 2164716 | 7/1972 | Germany . |
| 2455715 | 5/1975 | Germany . |
| 2928512 | 1/1981 | Germany . |
| 1262526 | 2/1972 | United Kingdom . |
| 92/21492 | 12/1992 | WIPO . |

OTHER PUBLICATIONS

Chemical Abstracts, vol. 104, 1986, p. 52, AN 69939w, JP 60,151,601, Aug. 9, 1985.

Chemical Abstracts, vol. 107, 1987, p. 93, AN 135968v, JP 61,258,870, Nov. 7, 1986.

Chemical Abstracts, vol. 110, 1989, pp. 104–105, AN 97285x, JP 63,196,667, Aug. 15, 1988.

Chemical Abstracts, vol. 88, 1978, p. 71, AN 52095w, JP 77,105936, Sep. 6, 1977.

Chemical Abstracts, AN–107: 135968, JP–61 258 870, Nov. 17, 1986.

*Primary Examiner*—Bernard Lipman
*Assistant Examiner*—N. Sarofim
*Attorney, Agent, or Firm*—Oblon, Spivak, McClelland, Maier & Neustadt, P.C.

[57] ABSTRACT

The invention relates to a coating composition, a method of coating molded articles with the coating composition, and the molded articles so coated, particularly molded articles comprised of thermoplastic or thermoelastic plastics. The coating, in the form of a cured thin layer, is particularly optically clear, scratch-resistant, and weather-resistant. It is produced on the plastic substrate material by polymerization of a layer of flowable coating comprised of the coating material, which layer contains polyfunctional (meth)acrylic monomers, and said layer further contains, as a "leveling" agent, fluoroalkyl (meth)acrylates of formula I

I

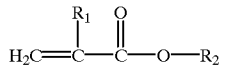

where $R_1$ represents H or $CH_3$, and $R_2$ represents a fluorine-containing alkyl group with 2–20 C atoms.

21 Claims, No Drawings

SCRATCH-RESISTANT COATING AGENT BASED ON ARCYLATES

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to flowable coating compositions for producing scratch-resistant coatings (SRCs), based on multifunctional acrylates and methacrylates, and a method of coating molded articles, particularly articles comprised of plastics, such as organic glasses, with a clear coating in the form of a hardened thin layer which arises from polymerization of essentially polyfunctional acrylic and/or methacrylic compounds, which coating is distinguished by high scratch-resistance even under conditions of open-air weathering.

2. Description of the Related Art

According to German laid-open applications DE 21 64 716 and DE 24 55 715, multifunctional acrylate systems can be polymerized with thermally decomposable polymerization initiators, the usual oil-soluble peroxides and azo compounds; or by irradiation, e.g. by UV radiation in the presence of photoinitiators.

Preferably, UV-initiation is used, because the method can be carried out in the presence of air. According to German laid-open application DE 29 28 512, an SRC with improved adhesion to the substrate results if such a UV polymerization is carried out between 70° C. and the glass transition temperature of the plastic to be coated.

Peroxide initiation is known for production of coated, scratch-resistant plates with good weather-resistance. According to European EP-B-O 245 728, the coating composition employs aliphatic peroxydicarbonates as peroxide free-radical initiators.

UV-hardenable SRCs formed from acrylic resins with added fluoroalkyl-group-containing (meth)acrylate comonomers are known from the following three Japanese patent publications:

Japanese Patent 63-196,667 (ref. CA 110:97285) discloses PC screen coatings, wherein the SRC compositions consist of the following, in a solvent mixture:

(a) 10–60% of (meth)acrylic acid esters of formula $$H_2C{=}C(R)CO_2CH_2R_f,$$

where R represents H or $CH_3$, and $R_f$ represents a fluoroalkyl group with 1–20 C atoms; and (b) polyfunctional acrylates;

Japanese Patent 60-151,601 (ref. CA 104:69,939) discloses coatings for plastic lenses comprised of polydiallyl compounds, wherein employed is a butylmethylketone solution with polyfunctional acrylates and dihydroperfluorohexyl acrylate in a weight ratio of 55:45; and Japanese Patent 77-105,936 (ref. CA 88:52,095) discloses coatings for polymethacrylate lenses, wherein employed is a flowable coating resin of polyfunctional acrylic esters, methyl methacrylate, and 1 wt. % of hexafluoropropyl methacrylate based on the weight of the monomers. The fluorine-containing comonomers confer improved optical properties and improved surface smoothness on the hard coating of the polymethacrylate lens.

Coating compositions for PMMA plates are disclosed in Japanese Patent 61-258,870 (ref. CA 107:135,968), which compositions consist of diacrylates, epoxyacrylates, and fluoroalkyl-group-containing methacrylates. These compositions, however, do not allow production of hard and scratch-resistant coatings.

Plastic molded bodies which have SRCs are particularly employed in the form of plates for protecting (or protecting from) machinery, or on building exteriors, e.g. on sound-protecting walls or as glazing panels of facades, bus stop enclosure walls, advertising panels, advertising pillars, and so-called "urban furniture". In such uses transparent, low-haze plastic molded bodies are particularly used, wherewith the SRC should also be clear and transparent.

The known coating compositions according to the state of the art, employing polyfunctional acrylates, either are subject to slight surface irregularities such as uneven, rough, or structured coatings due to insufficiencies in the leveling compositions, which irregularities result in optical non-uniformities in the coating, or else such known coating compositions contain solvents, which, as is known, improve the flowability characteristics of the coating, but upon curing, due to the volatility and evaporation of the solvent, may produce undesirable surface structures and optical irregularities ("Ullmanns Encyklopaedie der Technischen Chemie" 4th Ed Vol 15 pp 595 and 676–677). Moreover, a solvent-free coating composition with polyfunctional acrylates is advantageous with regard to environmental protection and occupational health and safety.

OBJECT OF THE INVENTION

The object of the present invention was to devise flowable coating compositions for producing scratch-resistant coatings (SRCs) for molded articles, wherein the coating composition has good flow properties when applied, and can be cured in a process which is substantially free of emissions (low VOC).

SUMMARY OF THE INVENTION

It was surprisingly discovered that these and other objects can be achieved through the use of coating compositions containing multifunctional (meth)acrylate monomers, or mixtures of such monomers, in conjunction with fluorinated-alkyl-group-containing comonomers. The subject coating compositions exhibit good flow properties when applied to the molded articles which are to be used as substrates, and when subjected to polymerization in the presence of azo compounds or peroxides as initiators, or particularly to polymerization initiated by UV irradiation in the presence of photoinitiators, produce highly scratch-resistant and weather-resistant coatings with substantially improved optical quality.

Outstanding flow characteristics are provided by fluorinated-alkyl-group-containing (meth)acrylate monomers, when used as leveling compositions in the inventive coating compositions, which fluorinated monomers have formula

I

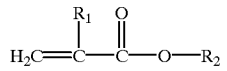

where $R_1$ represents H or $CH_3$; and $R_2$ represents $C_aH_bF_c$, where a=2–20; b=0–4; and c=2a+1−b; in amounts of from 2–40 wt. %, preferably 5–30 wt. %, and more preferably 5–20 wt. % based on the total weight of the polymerizable components contained in the coating composition, when the flowable coating composition is being applied. After the curing of the inventive coating composition by polymerization, the substances serving as leveling compositions are chemically bound into the structure and are not capable of migrating, in contrast to the customarily used nonpolymerizable leveling compositions.

DESCRIPTION OF THE PREFERRED EMBODIMENTS

The invention relates to coating compositions for producing a scratch-resistant and weather-resistant coating on a molded article, by application of a flowable coating composition having radically polymerizable crosslinking monomers and/or reactive oligomers which monomers and/or oligomers have at least two polymerizable carbon double bonds, in admixture with additional monomers containing a polymerizable double bond, along with customary additives, and curing of the coating by polymerization, to yield a coating with good optical quality wherein the coating composition contains as a "leveling" composition, a fluorinated-alkyl-group-containing (meth) acrylate monomer having the formula

I

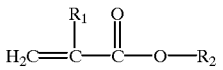

where $R_1$ represents H or $CH_3$; and $R_2$ represents $C_aH_bF_c$, where a=2–20; b=0–4; and c=2a+1–b; wherein these monomers are present in the amount of 2–40 wt. % based on the total weight of the polymerizable components contained in the coating composition.

The coatings resulting from the novel coating compositions have excellent scratch resistance, and in addition, due to superior flow properties, have excellent optical quality. Further, Xeno tests of weather resistance, as per DIN 53387 show that SRCs produced on substrates such as extruded acrylic glass using the inventive coating compositions demonstrate good weather resistance.

The weather resistance of plastic molded articles bearing the inventive SRCs containing fluorinated-alkyl-group-containing (meth) acrylates and polyfunctional (meth) acrylates can be further substantially improved by the use of UV-protective compositions and anti-aging compositions, particularly UV-protective compositions which are co-polymerizable.

The inventive coating compositions and the coatings produced therefrom are preferably composed of:

(i) ≦30 wt. % of a polyfunctional (meth)acrylate compound, (ii) <30 wt. % of a second, co-polymerizable compound, and (iii) 2–40 wt. % of a fluorinated-alkyl-group-containing (meth)acrylate monomer of formula I.

Comparisons of the scratch resistance of the subject invention optically improved coatings with known scratch-resistant coatings (SRCs) based on polyacrylates or polysiloxanes on plastic substrates, show that the subject coatings display superior scratch resistance. The manufacture of the polyacrylate coating has practical advantages in that the coating cures thoroughly in a matter of seconds to minutes, whereas polysiloxane coatings require several hours to cure at comparable curing temperatures.

The subject SRC are applicable to molded articles in general, particularly to plastic molded articles which have hard glossy surfaces which are susceptible to scratching. Among the plastics which have low surface hardness are those which have little or very little crosslinking and can be processed to form molded articles while in a thermoplastic or thermoelastic state. Non-limiting examples are polymethyl methacrylate (PMMA); mixed polymers of methyl methacrylate with additional (meth) acrylic or acryl monomers, for example acrylonitrile with 60 wt. % of methyl methacrylate; polystyrene; high impact styrene mixed polymers; polyethylene; polypropylene; polyvinyl chloride; cellulose; and polycarbonates based on bisphenol A.

The inventive coating composition for plastics is applied to the molded article in the article's final form, e.g. to a finished injection molded part, because the highly crosslinked scratch-resistant coating is not deformable, either thermoplastically or thermoelastically. The coating allows some but only limited elastic flexure of the plastic molded article. In a preferred embodiment of the invention, flat plates or continuously manufactured flat strips, hollow profile plates, or films, are coated directly following extrusion, preferably in a continuous process. In a particularly preferred embodiment, injection molded articles manufactured in large serial production are coated.

Coating compositions which according to the invention have good flow properties and cure to form highly crosslinked, scratch-resistant and weather-resistant coatings, contain as essential components, up to 40 wt. % of one or more fluorinated-alkyl-group-containing (meth)acrylate monomers of formula I, and one or more radically polymerizable (meth)acrylic compounds with at least two and preferably three or more polymerizable carbon double bonds.

Preferred tri- or higher functional (meth) acrylate monomers are acrylate esters of tri- or higher hydric alcohols such as glycerin, 2,2-di(hydroxymethyl)-1-butanol (trimethylopropane, TMP), 1,2,4-butanetriol, 1,2,6-hexanetriol, pentaerythritol, diglycerol, or dipentaerythritol. Preferred polyfunctional monomers are TMP triacrylate, pentaerythritol triacrylate and/or pentaerythritol tetraacrylate, and 1,2,6-hexanetriol triacrylate.

The proportion of methacrylic groups in relation to acrylic groups in the (meth)acrylic monomers should be kept as low as possible. Preferably, methacrylic monomers should represent ≧30 wt. %. One may also use, as polymerizable (meth)acrylic compounds reactive, advantageously polyfunctional oligomers, e.g. urethane di- or triacrylates or the corresponding ester acrylates.

In addition to the monomers designated as essential, the co-use of other monomers having one or two radically polymerizable double bonds confers advantages in the handling of the generally highly viscous tri- and multifunctional monomers and/or oligomers, and in the properties of the cured coating, e.g. improved flexibility. Examples of candidates for use as monomers with a polymerizable double bond are styrene, acrylonitrile, and (meth)acrylates with 1–10 C atoms in the ester group, these (meth)acrylates optionally substituted with for example OH groups in the ester moiety. Particularly preferred are monomers with boiling points upwards of 140° C. and an acrylic group as a polymerizable unit.

Examples of suitable bifunctional comonomers are 1,4-divinylbenzene, or the di(meth)acrylates of alkylene glycols such as ethylene glycol, diethylene glycol, tetraethylene glycol, 1,2-propanediol, 1,4- or 1,3-butanediol, dimethylpropanediol, 1,6-hexanediol, neopentyl glycol, or 2-ethyl-2,3-hexanediol. In such bifunctional comonomers the proportion of methacrylates should also be minimized.

Examples of fluorinated-alkyl-group-containing (meth) acrylate monomers of formula I which can be used according to the invention and which provide good flow properties of the coating composition when said composition is applied are the following: 2,2,2-trifluoroethyl methacrylate; 2,2,3,3-tetrafluoropropyl acrylate; 2,2,3,3-tetrafluoropropyl methacrylate; 2,2,3,4,4,4-hexafluorobutyl acrylate; 2,2,3,4,4,4-hexafluorobutyl methacrylate; nonadecafluoroisodecyl methacrylate; 2,2,3,3,4,4,4-heptafluorobutyl acrylate; 2,2,3,3,4,4,5,5,6,6,7,7,7-tridecafluoroheptyl acrylate; 2,2,3,3,4,4,5,5,6,6,7,7,8,8,9,9,9-heptadecafluorononyl acrylate; 2,2,3,3,4,4,5,5,6,6,7,7,8,8,9,9,10,10,11,11,11-heneicosafluoroundecyl acrylate; 3,3,4,4,5,5,6,6,7,7,8,8,9,9,10,10,11,11,12,12,12-heneicosafluorododecyl acrylate; 4,4,5,5,6,6,7,7,8,8,9,9,10,10,11,11,12,12,13,13,14,14,15,15,15-tetracosafluoro-2-hydroxy-14-(trifluoromethyl)-pentadecyl acrylate; and 3,3,4,4,5,5,6,6,7,7,8,8,9,9,10,10,11,11,12,12,13,13,14,14,15,15,16,16,17,17,18,18,19,19,20,20,20-heptatriacontafluoroeicosyl acrylate. The described fluorinated-alkyl-group-containing monomers are known compounds.

Examples of fluorinated-aryl-group-containing (meth) acrylate monomers which may optionally be used in the subject coating compositions, particularly in combination with the fluorine-containing compounds of formula I, are 2,3,5,6-tetrafluorophenyl acrylate and 2,3,5,6-tetrafluorophenyl methacrylate.

The fluorine-containing (meth)acrylate monomers are present in the coating composition in an amount of 2–40 wt. %, preferably 5–20 wt. % and particularly preferably 5–10 wt. % based on the total weight of all polymerizable compounds. These amounts confer good flow properties as well as superior optical qualities to the coating.

UV-protective compositions of the type known to be usable as plastics additives ("Ullmanns Encyklopaedie der Technischen Chemie", 4th Ed Vol 15 pp 253–260), when mixed into the composition, and/or, advantageously polymerizable UV-stabilizers, provide improved weather resistance to the inventive coatings. Such stabilizers are known. An example is 3-(2-benzotriazolyl)-2-hydroxy-5-t-octylbenzylmethacrylamide.

The viscosity of the coating mixture and the properties of the cured coating are affected by the ratio of the various monomer types in the mixture. The greatest scratch resistance is contributed by the tri- and multifunctional monomers, but these also confer brittleness. Preferably their proportion is ≦30 wt. %. The total amount of bifunctional monomers, which also contribute to scratch resistance of the resulting coated plastic articles, including any monofunctional monomers such as the fluorine-containing comonomers, generally does not exceed 70 wt. %. UV-protective compositions are employed in the amount of 1–10 wt. % based on the weight of the monomers forming the coating.

The coating composition can be cured by means of thermally decomposable initiators such as peroxides or azo compounds. Advantageously, however, the coating is cured with UV light in the presence of known photoinitiators. The curing temperatures are generally in the range 0°–50° C., particularly in the neighborhood of 20° C. (room temperature curing). Antioxidants and customary additives such as polyester resins, may be added.

The coating composition may be applied to the plastic articles by various techniques, such as dipping, roll application, pouring, or spraying, in a discontinuous or continuous fashion, to provide coating thicknesses of 1–100 micron, preferably 2–50 micron. It is advantageous to coat plastic plates following continuous fabrication of the plates by extrusion, preferably while the plates are still at a relatively high temperature, but below the glass temperature of the plates, using a continuous coating process. Ordinarily the coating composition is cured at temperatures below the glass temperature of the plastic being coated. To exclude polymerization-inhibiting oxygen, the polymerization may be carried out under an inert gas, e.g. nitrogen. The curing time is on the order of seconds to minutes, e.g. 5–1000 sec, and essentially depends on the temperature reached by the coating composition.

Having generally described this invention, a further understanding can be obtained by reference to certain specific examples which are provided herein for purposes of illustration only and are not intended to be limiting unless otherwise specified.

EXAMPLES

Example 1

A mixture comprised of (39 - 0.4 X) parts by weight (pbw) pentaerythritol tetraacrylate, (59 - 0.6 X) pbw 1,6-hexanediol diacrylate, X pbw of a fluorinated monomer which improves flow characteristics, and 2 pbw Darocur® 1116, was applied to plates of Makrolon® 281 by means of a spiral doctor applicator, to give a wet film thickness of 12 micron. After 2 min settling time the coating was hardened using a high pressure mercury lamp (model F450 available from the firm Fusion Systems), under a nitrogen atmosphere. Then various surface irregularities which depend on the coating were evaluated. Taber abrasion was measured according to DIN 52347, 100 rotations, CS10F, 5.4 N/rad).

TABLE 1

| Flowable coating composition | Monomer | X | Taber test (% haze) | Flow characteristic | Remarks |
|---|---|---|---|---|---|
| A | — | — | 1.6 | — | Strong drawing marks |
| B | 2,2,3,3-tetrafluoropropyl methacrylate | 10 | 1.4 | + | Smooth surface |
| C | 2,2,3,3-tetrafluoropropyl methacrylate | 20 | 1.7 | ++ | Very smooth surface |
| D | 2,2,2-trifluoroethyl methacrylate | 15 | 1.6 | ++ | Very smooth surface |
| E | 1,1,1,3,3,3-hexafluoro isopropyl methacrylate | 10 | 1.5 | + | Smooth surface |

Example 2

Coating compositions A and C from Example 1 were applied by a reverse roll coating method at optimized machine parameters, to plates comprised of Makrolon® 281. After 2 min settling time, the coating was cured under a nitrogen atmosphere, and the optical quality of the coating was evaluated.

TABLE 2

| | Coating A | Coating C |
|---|---|---|
| Application characteristics | Depressions; orange-peel texture. | Very smooth surface. |
| Substrate wetting: | Deficient. | Good. |
| Visual evaluation of light transmission | Ridges in the direction of application; optically irregular. | No ridges. Very uniform. Optically smooth. |

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A scratch-resistant, weather-resistant, polymerized coating having desirable optical properties, prepared by the process comprising:

(a) applying to a substrate a polymerizable flowable coating composition, said composition comprising as components (i) one or more multi-functional (meth)acrylate monomers, said multi-functional monomers containing two or more polymerizable carbon-carbon double bonds;

(ii) one or more singly unsaturated comonomers;

(iii) from 5–40 wt. percent, based on the total weight of all polymerizable monomers in said composition, of a fluorinated-alkyl-group-containing leveling agent having the formula

I

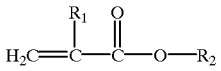

wherein $R_1$ represents H or $CH_3$; and $R_2$ represents $C_aH_bF_c$, wherein a is an integer of from 2–20, b is an integer of from 0–4, and c=2a+1−b; and (iv) optionally, customary additives; and (b) curing said coating composition by polymerization.

2. The coating of claim 1, wherein said component (i) comprises a multifunctional (meth)acrylate monomer or oligomer having three or more polymerizable double bonds in an amount such that the weight percent of said (meth) acrylate monomer or oligomer having three or more double bonds comprises 30 wt. % or more of all polymerizable monomers; and from 5–20 wt. % of said fluorinated-alkyl-group-containing (meth)acrylate monomer I based on the total of all polymerizable monomers.

3. The coating of claim 1, wherein component (i) contains a difunctional monomer, and wherein at least 70 wt % of said component (i) comprises acrylates.

4. The coating of claim 2, wherein component (i) contains a difunctional monomer, and wherein at least 70 wt % of said component (i) comprises acrylates.

5. The coating of claim 1, wherein said component (iv) comprises a UV-protective agent.

6. The coating of claim 2, wherein said component (iv) comprises a UV-protective agent.

7. The coating of claim 3, wherein said component (iv) comprises a UV-protective agent.

8. The coating of claim 4, wherein said component (iv) comprises a UV-protective agent.

9. The coating of claim 5, wherein said UV protective agent contains a polymerizable double bond.

10. The coating of claim 6, wherein said UV protective agent contains a polymerizable double bond.

11. The coating of claim 7, wherein said UV protective agent contains a polymerizable double bond.

12. The coating of claim 8, wherein said UV protective agent contains a polymerizable double bond.

13. A non-aqueous, solvent free, polymerizable coating composition suitable for the preparation of scratch-resistant, weather-resistant coatings having desirable optical properties, comprising:

(i) one or more multi-functional (meth)acrylate monomers, said multi-functional monomers containing two or more polymerizable carbon-carbon double bonds;

(ii) one or more singly unsaturated comonomers;

(iii) from 5–40 wt. percent, based on the total weight of all polymerizable monomers in said composition, of a fluorinated-alkyl-group-containing leveling agent having the formula

I

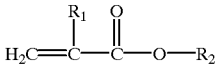

wherein $R_1$ represents H or $CH_3$;and $R_2$ represents $C_aH_bF_c$, wherein a is an integer of from 2–20, b is an integer of from 0–4, and c=2a+1−b; and (iv) optionally, customary additives.

14. The polymerizable coating composition of claim 13, wherein said component (i) comprises a multifunctional (meth)acrylate monomer or oligomer having three or more polymerizable double bonds in an amount such that the weight percent of said (meth)acrylate monomer or oligomer having three or more double bonds comprises 30 wt. % or more of all polymerizable monomers; and from 5–20 wt. % of said fluorinated-alkyl-group-containing (meth)acrylate monomer I based on the total of all polymerizable monomers.

15. The polymerizable coating composition of claim 13, wherein component (i) contains a difunctional monomer, and wherein at least 70 wt % of said component (i) comprises acrylates.

16. The polymerizble coating composition of claim 1, wherein said component (iv) comprises a UV-protective agent.

17. The polymerizable coating composition of claim 1, wherein said component (iv) comprises a UV-protective agent.

18. The coating of claim 1, wherein said composition comprises less than 30 wt. % of said singly unsaturated comonomers.

19. The coating of claim 1, wherein methacrylic monomers are ≧30 wt. % of (meth)acrylic monomers in said composition.

20. The polymerizable coating composition of claim 13, wherein said composition comprises less than 30 wt. % of said singly unsaturated comonomers.

21. The polymerizable coating composition of claim 13, wherein methacrylic monomers are ≧30 wt. % of (meth) acrylic monomers in said composition.

* * * * *